Oct. 3, 1933.  F. P. STEINHAUER  1,929,220
AUTOMATIC HITCH
Filed May 31, 1932   3 Sheets-Sheet 1

Inventor:
Fritz P. Steinhauer,

Oct. 3, 1933.  F. P. STEINHAUER  1,929,220
AUTOMATIC HITCH
Filed May 31, 1932   3 Sheets-Sheet 2
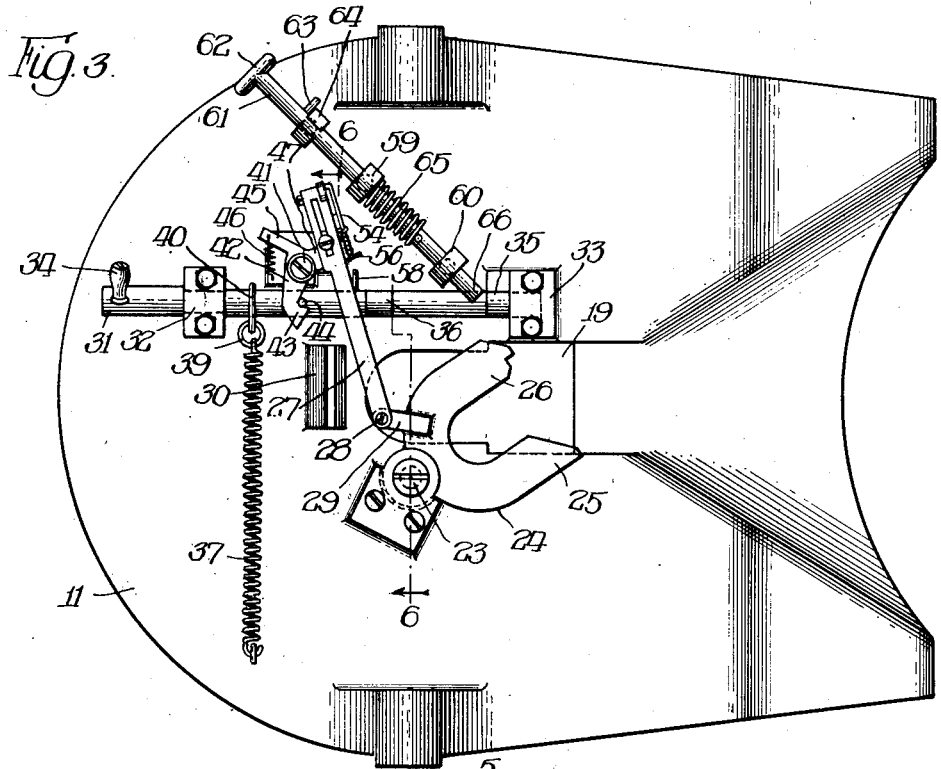
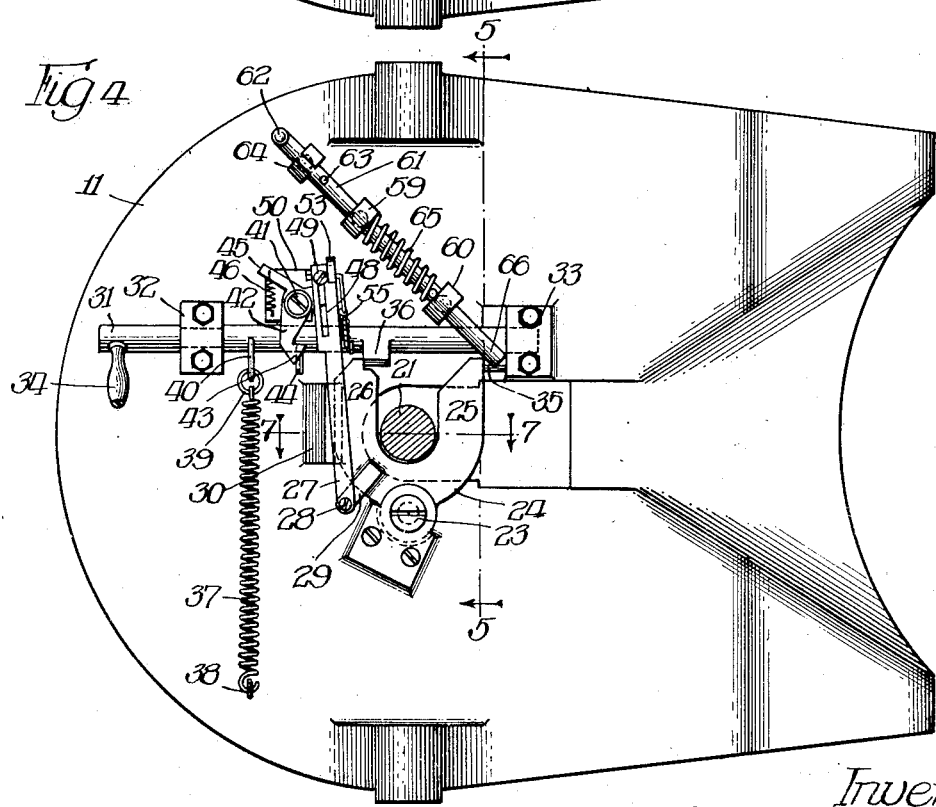
Inventor:
Fritz P. Steinhauer,
By Cromwell, Greist & Warden
Attys.

Oct. 3, 1933.  F. P. STEINHAUER  1,929,220
AUTOMATIC HITCH
Filed May 31, 1932  3 Sheets-Sheet 3
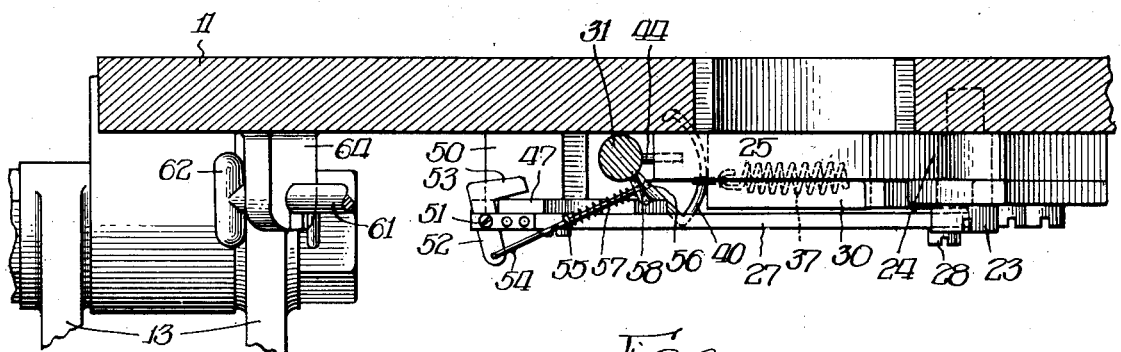
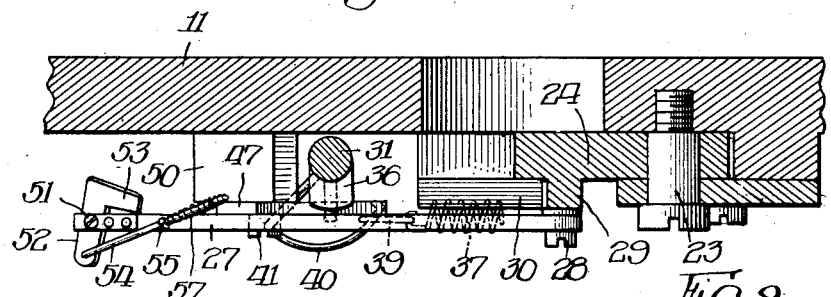
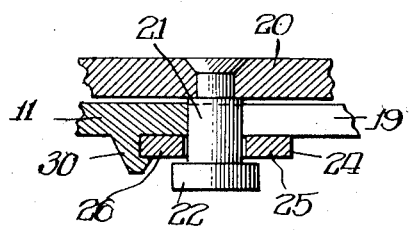
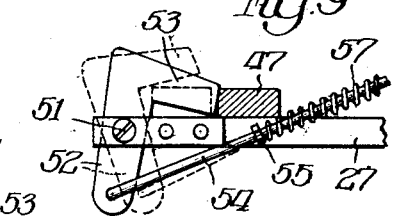
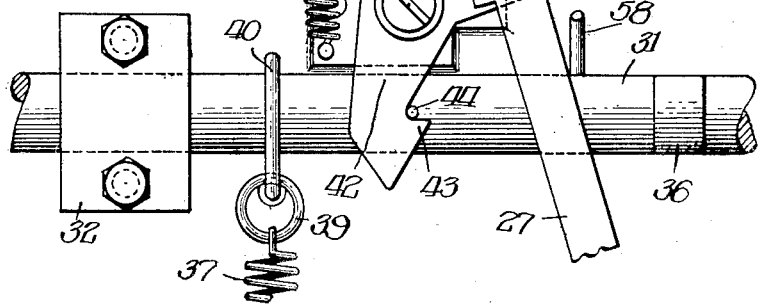
Inventor:
Fritz P. Steinhauer,
By Cromwell Greist Warden
Attys Patented Oct. 3, 1933

1,929,220

UNITED STATES PATENT OFFICE 1,929,220

AUTOMATIC HITCH

Fritz P. Steinhauer, Chicago, Ill.

Application May 31, 1932. Serial No. 614,329

12 Claims. (Cl. 280—33.1)

The present invention relates to automatically engageable and easily releasable hitches adapted typically, though not exclusively, to form a draft connection between a tractor and a trailer, whether a truck, a road machine, a farm implement, or what not.

Ordinarily, by reason of the very nature of the tractor and trailer, heavy duty devolves upon the draft connection or coupling which nevertheless should be engageable automatically and re-easably with a minimum of manipulation, marked by dependability in service, proof against accidental release, and substantially resistant to breakage by shocks incident to rough use.

It is not new to provide automatically operating couplings as, for instance, in railway cars; nor it is new to equip tractors and trailers with such coupling devices. The object of my invention is so to redesign such structures as to attain in the highest degree the desirable characteristics above enumerated, together with other advantages which will appear to those skilled in this art as the invention is hereinafter set forth and disclosed in the accompanying drawings illustrative of a preferred embodiment.

In the drawings,

Fig. 3 is a bottom plan view of the tractor plate with the hitch in open or released position;

Fig. 4 is a similar view with the hitch mechanism in closed position;

Fig. 5 is a transverse section on the line 5—5 of Fig. 4;

Fig. 6 is a similar section on the irregular line 6—6 of Fig. 3;

Fig. 7 is a detail fragmentary section on the line 7—7 of Figs. 1 and 4;

Fig. 8 is an enlarged detail of the detent and trigger mechanism; and

Fig. 9 is a fragmentary detail illustrative of the trigger mechanism.

Figure 1:
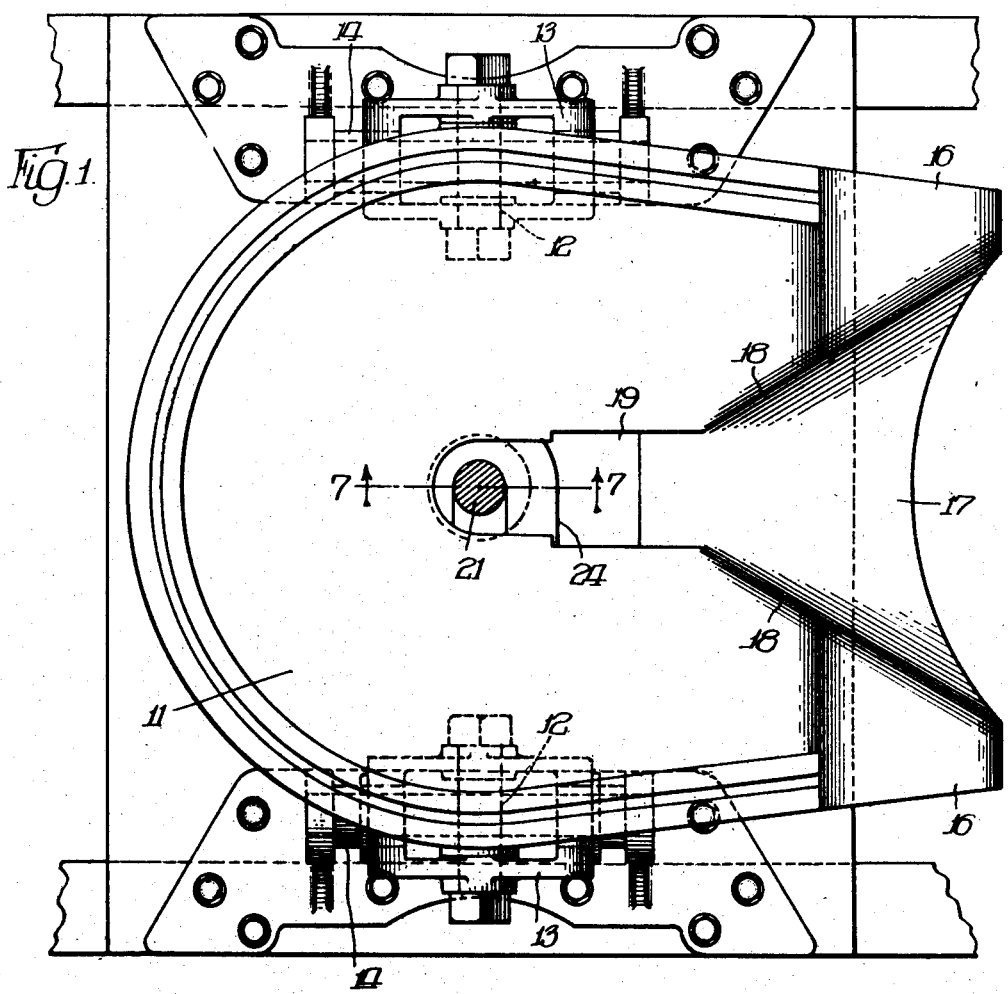
Fig. 1 is a top plan view of the tractor fifth wheel or plate, upon the under side of which is mounted the operating mechanism comprising the present invention.
Figure 2:
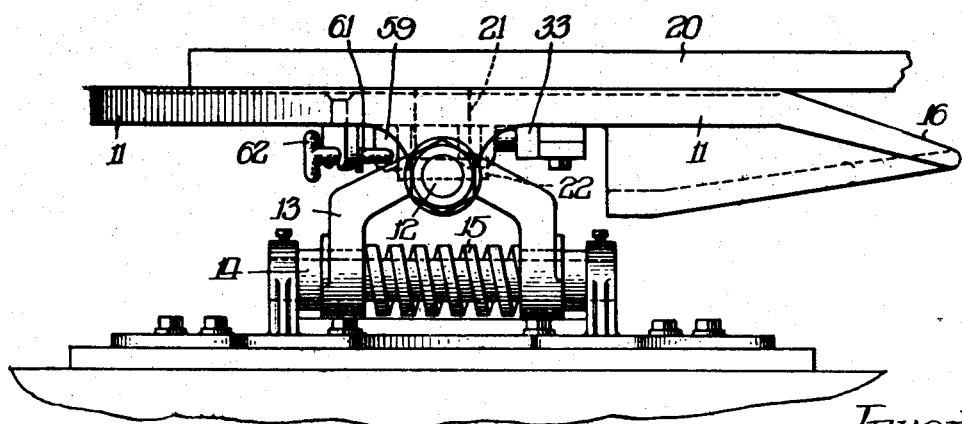
Fig. 2 is a side elevation of the tractor plate with associated trailer plate or tongue.

Referring to the drawings for a more detailed description of the preferred embodiment therein illustrated, the reference numeral 11 designates the tractor plate in the form of a fifth wheel suitably mounted by means of trunnions 12 in yokes 13 mounted upon side members 14 with interposed spring 15. The mounting of the tractor plate forms of itself no part of the present invention.

The rear end of the tractor plate slopes downwardly and to the rear as indicated at 16, and is provided in such portion with a concave web 17 bridging the space between the inclined portions 16. The concave web 17 continues forwardly along converging lines 18 to the mouth of a slot 19 which is closed at its forward end adjacent the center of the plate 11.

The parts 16 to 19 inclusive serve as guides whereby the trailer tongue 20, which may also be in the form of a fifth wheel overlying the plate 11, is directed into such position in the act of coupling the trailer with the tractor. The trailer plate or tongue 20 carries a depending king pin or draft lug 21 terminally provided with an enlarged head 22, best shown in Fig. 7, which draft pin is arranged to extend within and through the slot 19.

Pivoted at 23 upon the under side of the tractor plate adjacent one side of the terminal portion of the slot 19 is a yoke 24, the two arms 25 and 26 of which are spaced apart a distance corresponding to the diameter of the draft pin 21. This yoke is arranged to swing in its own plane from a closed position with its arms 25 and 26 extending at right angles to the slot 19, as shown in Fig. 4, through an arc of approximately 45° to an open position, as shown in Fig. 3, with its mouth formed by the space between the arms registering obliquely with the slot 19. The swinging of the yoke in an opening direction is limited by a link 27 pivoted at 28 to a yoke extension 29, while the swinging of the yoke in a closing direction is limited by the rigid abutment 30 on the lower face of the plate.

A rockable locking bar 31 is journaled at 32 and 33 and provided with an operating handle 34. This bar is provided with laterally projecting keeper lugs 35 and 36. The bar is yieldingly urged to the locking position shown in Fig. 4 by a spring 37 with its keeper lugs 35 and 36 in front of the yoke arms 25 and 26 respectively, whereby the yoke is held in its closed position, an abutment being provided for each arm of the yoke against the pull exerted by the draft pin 21, thus forming with the yoke pivot 23 a three-point resistance to the pull on the draft pin 21 of the trailer.

The connection of the spring 37 with the plate 11 is by means of an eye 38 and with the locking bar 31 by means of a ring 39 which rides upon an arcuate pin 40 projecting from the bar 31, the relation of the parts being such that the tension of the spring 37 remains substantially constant in the rocking of the bar between its locked and unlocked positions.

Pivoted to the tractor plate at 41, to swing in a horizontal plane, is a detent 42 having a beak 43 for engagement with a pin 44 of the bar 31 to hold the same in unlocked position against the tension of the spring 37. The detent is also provided with a tail member 45 which is pressed in an engaging direction by the spring 46. A nose member 47 extending in an opposite direction intermediate the beak 43 and the tail 45 serves for engagement by a trigger mechanism whereby the pin 44 of the locking bar 31 may be released from the beak 43 of the detent in the final closing movement of the yoke, thus permitting the keeper lugs to engage the yoke arms as abutments.

The link 27 previously referred to as attached at one end to the yoke is for a distance adjacent its opposite end slotted as indicated at 48 and slides upon a headed pin 49 on the block 50 which also serves as a mounting for the detent 42. At the extremity of the slotted end of the link is pivoted at 51 to swing in a vertical plane an L-shaped trigger member comprising a vertical portion 52 and a horizontal portion 53, which latter serves as a sear to engage the nose of the detent to swing the same in the final closing movement of the yoke. The vertical portion 52 of the trigger member has extending therefrom towards the locking bar a link rod 54 guided through an eye 55 and having a hooked end 56 between which and the eye is mounted about the link 54 a spring 57.

The hooked end 56 of the rod 54 is free in the unlocked position of the locking bar 31, but in the locking position of the bar is engaged by a pin 58 projecting from the locking bar; whereby in the unlocked position the trigger is held by the spring with the sear portion closely overlying and bearing against the link 27 in the same plane as the nose 47 of the detent, as shown in Figs. 6 and 9, and serves to move the same in a direction to release the locking bar as the link is shifted by the final closing movement of the yoke. When the yoke reaches its closed position and the locking bar, released from the detent by the action of the sear, is rocked by its spring 37 to interpose the lugs 35 and 36 as abutments to prevent the opening of the yoke, the engagement of the hooked end 56 by the pin 58 has drawn the vertical portion of the trigger towards the yoke and has thereby withdrawn the sear 53 from contact with the upper face of the link 27, thus permitting the sear 42 to swing upon its pivot under the influence of its spring 46 and the nose 47 of the detent to enter between the link and the sear, as illustrated in Figs 5 and 9.

As the bar 31 is manually rocked by the handle 34 to an unlocked position, the hooked end 56 of the link 54 is released from the pin 58 of the locking bar and the sear is held against the upper face of the detent nose 47 by the action of the spring 57; and as the yoke, relieved from the abutments 35 and 36, swings to an open position, the link 27 moves upon the pin 49, carrying the trigger away from the nose of the link, and the action of the spring 57 serves to snap the sear 53 back to its set position bearing against the upper side of the link, as shown in Fig. 6.

In the closing movement of the yoke, the link again brings the sear into contact with the nose of the link, and as the closing movement of the yoke is completed, the sear serves to push the nose of the detent into such position that the detent beak releases the pin 44 of the locking bar, permitting the bar to rock to its locking position, while the sear being withdrawn from contact with the link, the detent is swung by its spring 46 to set position, while its nose 47 again enters between the sear and the link.

It will thus be seen that the invention provides for the automatic closing of the yoke by the entering king pin or draft lug of the trailer and in such closing movement for the setting of the trigger mechanism at the final instant for the release of the locking bar from the detent through the tripping action of the sear; that in the closed position of the yoke any forward thrust of the trailer draft lug is borne not only by the yoke arm 26 and the massive abutment 30 but by the closed end of the slot, while the pull of the king pin or draft lug is transmitted not only to the yoke pivot 23 but to the abutments 35 and 36 carried by the locking bar and engaging behind the yoke arms; that the unlocking of the yoke and the release therefrom of the king pin is readily effected by the manual turning of the locking bar by its handle to remove the abutments 35 and 36 from behind the yoke arms; that the setting and releasing of the trigger mechanism is effected automatically, whereby during the closing movement of the yoke upon the king pin the trigger mechanism acts to release the detent and finally to reset the detent for the next unlocking of the yoke.

The construction so far described is completely effective for the full cycle of operations, and would ordinarily suffice for the hitching and unhitching of a trailer; however, for long hauls it is sometimes desirable to provide means for manually locking the mechanism against accidental unlocking, and I have therefore provided means for positively holding the locking bar in locked position.

For this purpose I mount in the bearing blocks 59 and 60 for reciprocating and rocking movement a rod 61 having a handle 62. The rod 61 is held in its retracted position, as shown in Fig. 3, by a pin 63 engaging the split block 64 in opposition to the spring 65 in which retracted position the end 66 of the rod clears the abutment lug 35, thus permitting normal operation of the mechanism. If, however, as illustrated in Fig. 4, the handle 62 is so turned that the pin 63 can pass between the two elements of the split block 64, the spring 65 will project the rod into such position that its end 66 will overlie the abutment lug 35 and prevent the rocking of the locking bar 31 to an unlocked position.

It will be obvious that the forward arm of the yoke which registers with the end of the slot may be omitted while retaining measurably satisfactory results; in which case the corresponding abutment lug will also be omitted from the locking bar and the multiple resistance points for the pull of the draft pin will be constituted by the yoke pivot and the lug engaging the remaining arm.

I claim:

1. In a device of the character set forth, a tractor plate provided with a slot open to the rear and adapted to receive and guide the draft pin of a trailer tongue or the like, a yoke pivoted on the plate adjacent the closed end of the slot to swing from an open position with its mouth in register with the slot to such closed position that a yoke arm bridges the slot at a distance from the closed end corresponding to the slot width transforming that end of the slot into a draft pin accommodating aperture, a spring pressed locking member operable by the closing movement of the yoke to interpose abutments behind the yoke arms, whereby to constitute with the yoke pivot a three-point resistance to the pull of the draft pin, and manually operable means to remove the abutments and permit the opening of the yoke.

2. In a device of the character set forth, a tractor plate provided with a slot open to the rear and having a rearwardly sloping forwardly converging entrance adapted to receive and guide the depending draft pin of a trailer tongue, a U-shaped yoke pivoted on the under side of the plate at one side of and adjacent the closed end of the slot to swing in its own plane from an open pin-receiving position with its mouth in register with the slot to such closed pin-retaining position that a yoke arm bridges the slot at a distance from the closed end corresponding to the slot width transforming that end of the slot into a draft pin accommodating aperture and that the other yoke arm substantially registers with the end wall of the slot, a spring pressed locking member operable by the closing movement of the yoke to interposed abutments behind the yoke arms, whereby to constitute with the yoke pivot a three-point resistance to the pull of the draft pin, and manually operable means to remove the abutments and permit the opening of the yoke.

3. In a device of the character set forth, a tractor plate provided with a slot open to the rear and having a rearwardly sloping forwardly converging entrance adapted to receive and guide the depending draft pin of a trailer tongue, a U-shaped yoke pivoted on the under side of the plate at one side of and adjacent the closed end of the slot to swing in its own plane from an open pin-receiving position with its mouth in register with the slot to such closed pin-retaining position that a yoke arm bridges the slot at a distance from the closed end corresponding to the slot width transforming that end of the slot into a draft pin accommodating aperture and that the other yoke arm substantially registers with the end wall of the slot, a rockable locking bar journaled in bearings on the lower side of the plate and carrying laterally projecting lugs arranged to rock into engagement in front of the yoke arms in the closed position, whereby the lugs and the yoke pivot constitute a three-point resistance to the pull of the draft pin, spring means urging the bar to locking position, and manually operable means for turning the bar to unlocking position.

4. In a device of the character set forth, a tractor plate provided with a slot open to the rear and having a rearwardly sloping forwardly converging entrance adapted to receive and guide the depending draft pin of a trailer tongue, a U-shaped yoke pivoted on the under side of the plate at one side of and adjacent the closed end of the slot to swing in its own plane from an open pin-receiving position with its mouth in register with the slot to such closed pin-retaining position that a yoke arm bridges the slot at a distance from the closed end corresponding to the slot width transforming that end of the slot into a draft pin accommodating aperture and that the other yoke arm substantially registers with the end wall of the slot, a rockable locking bar journaled in bearings on the lower side of the plate and carrying laterally projecting lugs arranged to rock into engagement in front of the yoke arms in the closed position, whereby the lugs and the yoke pivot constitute a three-point resistance to the pull of the draft pin, spring means urging the bar to locking position, manually operable means for turning the bar to unlocking position, a detent holding the bar in unlocking position against the force of the spring, and trigger mechanism for releasing the detent, said trigger mechanism operable by the closing of the yoke and reset by the opening of the yoke.

5. In a device of the character set forth, a tractor plate provided with a slot open to the rear and having a rearwardly sloping forwardly converging entrance adapted to receive and guide the depending draft pin of a trailer tongue, a U-shaped yoke pivoted on the under side of the plate at one side of and adjacent the closed end of the slot to swing in its own plane from an open pin-receiving position with its mouth in register with the slot to such closed pin-retaining position that a yoke arm bridges the slot at a distance from the closed end corresponding to the slot width transforming that end of the slot into a draft pin accommodating aperture and that the other yoke arm substantially registers with the end wall of the slot, a rockable locking bar journaled in bearings on the lower side of the plate and carrying laterally projecting lugs arranged to rock into engagement in front of the yoke arms in the closed position, whereby the lugs and the yoke pivot constitute a three-point resistance to the pull of the draft pin, spring means urging the bar to locking position, manually operable means for turning the bar to unlocking position, and manually operable emergency means to hold the mechanism in locked closed position against accidental operation.

6. In a device of the character set forth, a tractor plate provided with a slot open to the rear and having a rearwardly sloping forwardly converging entrance adapted to receive and guide the depending draft pin of a trailer tongue, a U-shaped yoke pivoted on the under side of the plate at one side of and adjacent the closed end of the slot to swing in its own plane from an open pin-receiving position with its mouth in register with the slot to such closed pin-retaining position that a yoke arm bridges the slot at a distance from the closed end corresponding to the slot width transforming that end of the slot into a draft pin accommodating aperture and that the other yoke arm substantially registers with the end wall of the slot, a rockable locking bar journaled in bearings on the lower side of the plate and carrying laterally projecting lugs arranged to rock into engagement in front of the yoke arms in the closed position, whereby the lugs and the yoke pivot constitute a three-point resistance to the pull of the draft pin, spring means urging the bar to locking position, manually operable means for turning the bar to unlocking position, and manually operable emergency means to hold the mechanism in locked closed position against accidental operation, said emergency means comprising a rod guided on the plate and axially shiftable to and from a position engaging the lugs of the rockable locking bar.

7. In a device of the character set forth, a tractor plate provided with a slot open to the rear and having a rearwardly sloping forwardly converging entrance adapted to receive and guide the depending draft pin of a trailer tongue, a U-shaped yoke pivoted on the under side of the plate at one side of and adjacent the closed end of the slot to swing in its own plane from an open pin-receiving position with its mouth in register with the slot to such closed pin-retaining position that a yoke arm bridges the slot at a distance from the closed end corresponding to the slot width transforming that end of the slot into a draft pin accommodating aperture and that the other yoke arm substantially registers with the end wall of the slot, a rockable locking bar journaled in bearings on the lower side of the plate and carrying laterally projecting lugs arranged to rock into engagement in front of the yoke arms in the closed position, whereby the lugs and the yoke pivot constitute a three-point resistance to the pull of the draft pin, spring means urging the bar to locking position, manually operable means for turning the bar to unlocking position, a detent holding the bar in unlocking position against the force of the spring, trigger mechanism for releasing the detent, said trigger mechanism comprising a link attached to the yoke and guided for longitudinal movement, a sear pivoted to the link adjacent a nose of the detent, the sear shiftable about its pivot into and out of the plane of the detent nose, a link rod attached at one end to the sear and extending through a guiding member with its other end deflected to form a hook disposed in the path of a pin carried by the locking bar, and a spring surrounding the link rod between its hooked end and the guide.

8. In a device of the character set forth, a tractor plate provided with a slot open to the rear and having a rearwardly sloping forwardly converging entrance adapted to receive and guide the depending draft pin of a trailer tongue, a U-shaped yoke pivoted on the under side of the plate at one side of and adjacent the closed end of the slot to swing in its own plane from an open pin-receiving position with its mouth in register with the slot to such closed pin-retaining position that a yoke arm bridges the slot at a distance from the closed end corresponding to the slot width transforming that end of the slot into a draft pin accommodating aperture and that the other yoke arm substantially registers with the end wall of the slot, a rockable locking bar journaled in bearings on the lower side of the plate and carrying laterally projecting lugs arranged to rock into engagement in front of the yoke arms in the closed position, whereby the lugs and the yoke pivot constitute a three-point resistance to the pull of the draft pin, spring means urging the bar to locking position, manually operable means for turning the bar to unlocking position, a detent holding the bar in unlocking position against the force of the spring, trigger mechanism for releasing the detent, said trigger mechanism comprising a slotted link attached to the yoke and guided for longitudinal movement by a fixed stud within the slot, an L-shaped sear pivoted to the link at its angular intersection, the link underlying a nose of the detent, the horizontal leg of the sear shiftable about its pivot into and above the plane of the detent nose, a link rod attached at one end to the vertical leg of the sear and extending intermediate its length through a guiding member with its other end deflected to form a hook disposed in the path of a pin carried by the locking bar, and a spring surrounding the link rod between its hooked end and the guide.

9. In a device of the character set forth, a tractor plate provided with a slot open to the rear and adapted to receive and guide the draft pin of a trailer tongue or the like, a yoke pivoted on the plate adjacent the closed end of the slot to swing from an open position with its mouth in register with the slot to such closed position that a yoke arm bridges the slot at a distance from the closed end transforming that end of the slot into a draft pin accommodating aperture, a locking member operable by the closing movement of the yoke to interpose abutments to the yoke arms, whereby to constitute with the yoke pivot a three-point resistance to the pull of the draft pin, and manually operable means to remove the abutments and permit the opening of the yoke.

10. In a device of the character set forth, a tractor plate provided with a slot open to the rear and having a rearwardly sloping forwardly converging entrance adapted to receive and guide the draft pin of a trailer tongue, a U-shaped yoke pivoted on the under side of the plate at one side of the slot to swing in its own plane from an open pin-receiving position with its mouth in register with the slot to such closed pin-retaining position that a yoke arm bridges the slot at a distance from the closed end transforming that end of the slot into a draft pin accommodating aperture and that the other yoke arm substantially registers with the end wall of the slot, a locking member automatically operable by the closing movement of the yoke to interpose abutments to the yoke arms, whereby to constitute with the yoke pivot a three-point resistance to the pull of the draft pin, and manually operable means to remove the abutments and permit the opening of the yoke.

11. In a device of the character set forth, a tractor plate provided with a slot open to the rear and adapted to receive and guide the draft pin of a trailer tongue or the like, a yoke pivoted on the plate adjacent the closed end of the slot to swing from an open position with its mouth in register with the slot to such closed position that a yoke arm bridges the slot at a distance from the closed end corresponding to the slot width transforming that end of the slot into a draft pin accommodating aperture, a rockable locking bar secured on the plate and carrying laterally projecting lugs arranged to engage with the yoke in the closed position, whereby the lugs and the yoke pivot constitute a triple resistance to the pull of the draft pin, means urging the bar to locking position, and manually operable means for shifting the bar to unlocking position.

12. In a device of the character set forth, a tractor plate provided with a slot open to the rear and adapted to receive and guide the depending draft pin of a trailer tongue, a U-shaped yoke pivoted on the plate at one side of and adjacent the closed end of the slot to swing in its own plane from an open pin-receiving position with its mouth in register with the slot to such closed pin-retaining position that a yoke arm bridges the slot at a distance from the closed end transforming that end of the slot into a draft pin accommodating aperture, a locking member operable by the closing movement of the yoke to interpose an abutment behind the bridging yoke arm, whereby to constitute with the yoke pivot a multiple point resistance to the pull of the draft pin, a rigid abutment on the plate in front of the other yoke arm to resist the forward thrust of the draft pin, and manually operable means to remove the abutment from behind the yoke arm and permit the opening of the yoke.

FRITZ P. STEINHAUER.